UNITED STATES PATENT OFFICE.

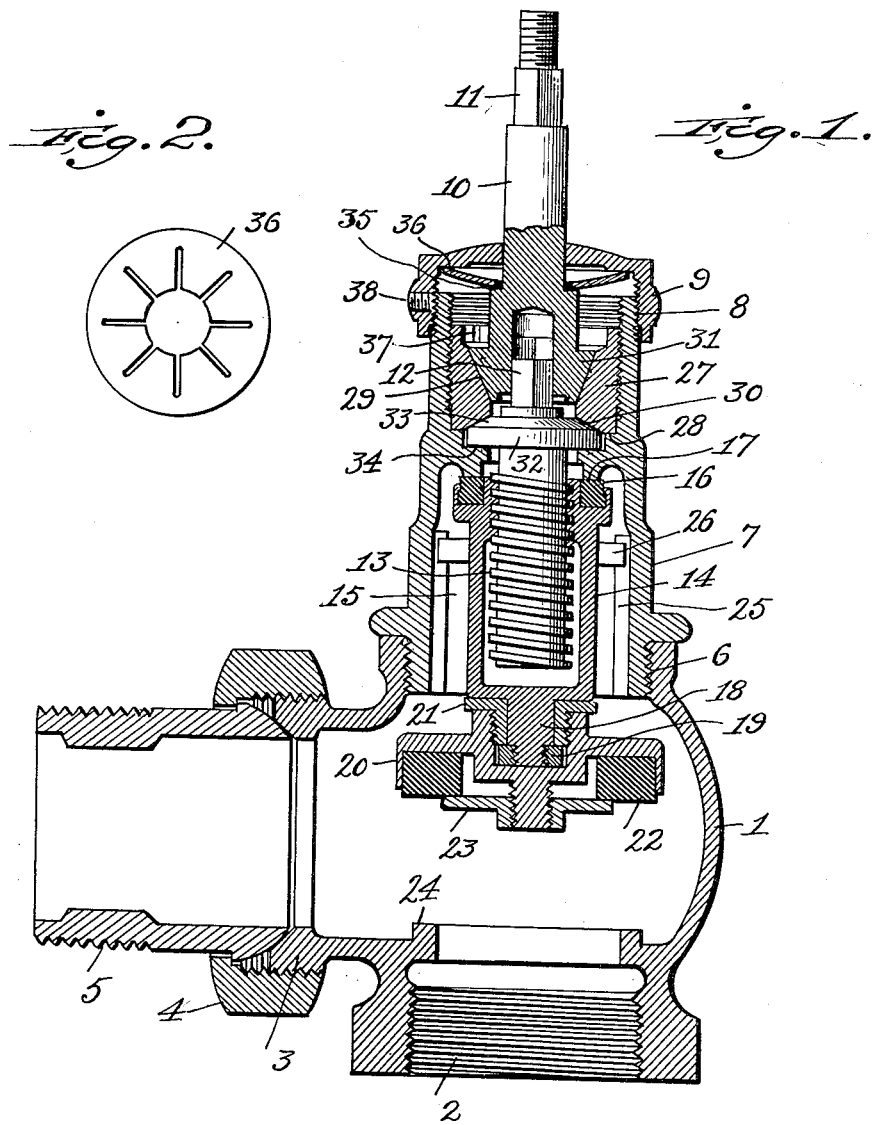

WILLIAM C. MARSH, OF DUNKIRK, NEW YORK.

RADIATOR-VALVE.

1,085,054.   Specification of Letters Patent.   Patented Jan. 20, 1914.

Application filed February 13, 1913. Serial No. 748,253.

*To all whom it may concern:*

Be it known that I, WILLIAM C. MARSH, a citizen of the United States, residing at Dunkirk, in the county of Chautauqua, State of New York, have invented new and useful Improvements in Radiator-Valves, of which the following is a specification.

My invention relates to valves, more especially adapted for use with radiators, and of that type commonly known as packless, and has for its object to provide novel means for sealing the valve stem and its parts not only when either completely open or completely closed, but also while in the act of being opened or closed.

In the accompanying drawing: Figure 1 is a central vertical sectional view of my improved valve. Fig. 2 is a detail top plan view of a disk spring used therein.

I have illustrated my improvements applied to a type of valve disclosed in an application filed by me December 20, 1912, Serial No. 737,860, and, like the same, my present construction embodies a radiator valve body 1 having the interiorly threaded inlet aperture 2 for the reception of the supply pipe, and the exteriorly threaded discharge 3, to which may be connected, by a union nut 4, a short threaded pipe section or nipple 5, for connection with a radiator. The upper side of the body 1 is apertured and interiorly screw threaded at 6 to receive a bonnet piece 7, which, together with said body 1, forms a casing, said bonnet piece being exteriorly screw threaded at 8 to receive a nut 9. Passing centrally through the nut 9 and extended into the bonnet piece 7 is the upper member 10 of a valve stem, having its upper end squared at 11 to receive a suitable handle, and being centrally apertured at its lower end and squared at the lower portion of said aperture to receive the stem 12 of the screw member 13 of said valve stem, said stem 12 being squared to fit into the aperture in the upper member 10, as shown. Said screw member 13 engages the screw threaded portion of a disk holder 14 located in a chamber 15 formed in the bonnet piece 7, said disk holder 14 having on its upper surface an annular recess adapted to receive a suitable hard packing disk 16, which, when said disk holder is in its uppermost position, contacts with an annular seat 17 formed on the bonnet piece 7 around the valve stem. The reduced lower end 18 of the disk holder 14 has screwed thereon a nut 19, over which fits a main valve disk holder 20, the same being retained in position by an apertured nut 21 loosely surrounding the reduced lower end 18 of disk holder 14 and screwed into said main valve disk holder 20. The lower surface of said main valve disk holder 20 is recessed annularly to receive a suitable hard packing disk 22, which is retained in position by a washer 23, said packing disk being adapted to engage a valve seat 24 in the body 1 when said valve disk holder is in its lowermost position.

The interior of the bonnet piece 7 is formed with suitable inwardly projecting guides 25 within which move vertically suitable lugs 26 projecting from the sides of the upper disk holder 14, whereby rotary motion of the latter is prevented. Screw threaded into the upper end of bonnet piece 7 is a lock nut 27, the same being limited in its downward movement by engagement with an annular shoulder 28 formed on the interior of the bonnet piece 7, and being formed with an annular upwardly and outwardly flaring cone surface 29, and with a downwardly and outwardly flaring cone surface 30. The lower end 31 of the upper member 10 of the valve stem is enlarged and formed cone shape to fit the cone surface 29 of lock nut 27, said surfaces being preferably machined to provide an accurate fit. Formed integral with the screw member 13 of the valve stem below the stem 12 thereof is a collar 32 having its upper surface 33 coned to fit the cone surface 30 of lock nut 27, and having its under flat surface resting on an annular shoulder 34 formed in the bonnet piece 7, as shown. Disposed between the nut 9 and a narrow shoulder 35 formed on the upper member 10 of the valve stem is a disk spring 36 shown in detail in Fig. 2, the same being inverted so that its outer edge will contact against the under side of said nut 9.

In operation the disk holder 14 and its parts and the screw member 13 of the valve stem are positioned within the valve body 1 as shown, with the lower face of collar 32 resting on the shoulder 34; the lock nut 27 is then screwed to position; the upper member 10 of the valve stem with the disk spring 36 thereon is then inserted to position with its lower aperture in engagement with the stem 12 of screw member 13 so that the two will rotate together, but have independent movement vertically with respect to each other; and the nut 9 is then screwed to position, bearing against the outer edge of disk spring 36, and thereby exerting an adjustable downward spring pressure upon the upper member 10 of the valve stem so that the abutting cone surfaces of the lower end 31 and the lock nut 27 will be maintained in sealing contact. Now, when the valve stem is being rotated to move the disk holder 14 to open the radiator valve there will be exerted a downward thrust on the screw member 13 of the valve stem and its collar 32, which will be resisted by the shoulder 34, thus forming a seal between said shoulder and the lower face of collar 32, which seal is supplemented, when the valve is completely opened, by the seal then formed by the contact of packing disk 16 with seat 17. Conversely, when the valve stem is being rotated in the opposite direction to close the valve, there will be an upward thrust on the screw member 13 of said valve stem and its collar 32, which will result in a more intimate contact between the engaging cone surfaces 30 and 33 on said lock nut 27 and collar 32, respectively, which will result in a similar sealing of the parts. Furthermore, no matter what the position of the parts may be, there will be at all times a downward tension on the upper member 10 of the valve stem, due to the constant pressure exerted thereon by the disk spring 36 and to the independent longitudinal movement afforded between upper member 10 and screw member 13 of the disk valve, thereby affording at all times a perfect seal between the contacting cone surfaces on the lower enlarged end 31 of upper member 10 and the lock nut 27, this contact being aided by the constant re-grinding occurring between said cone surfaces, due to the rotation of the valve stem. It will also be observed that when the valve is completely opened the contact between ring 16 and its seat 17 will cause a downward screw pressure on the screw member 13 of the valve stem, causing collar 32 to press firmly on shoulder 34, and that when the valve is completely closed the screw pressure will be reversed, causing collar 32 to press as firmly against the lock nut 27.

This valve is designed especially for use in connection with vacuum heating systems, where it is very essential that a perfect seal should be maintained at all times.

If desired, the upper inner edge of the lock nut 27 may be provided with suitable slots 37 to receive a spanner for manipulating said lock nut. Also, a locking screw 38 may be tapped through nut 9 to lock the same in any adjusted position.

Having thus described my invention, what I claim as new and desire to secure by Letters Patent is:

1. A valve, embodying a casing, a two-part valve stem comprising a lower screw member and an upper member independently movable longitudinally with respect to each other, coöperating sealing surfaces on said upper member and in said casing, and oppositely disposed sealing surfaces against which said screw member contacts to seal the same against thrust in either direction.

2. A valve, embodying a casing, a two-part valve stem rotatable in said casing, said parts being independently movable longitudinally with respect to each other, a valve closure carried by and longitudinally movable on one of said valve stem parts to and from its closed position when said valve stem is rotated, a cone surface on said last named part contacting with a similar surface in the casing to limit movement in one direction of said part, other contacting surfaces on said last named part and in the casing to limit movement of said part in the opposite direction, coöperating cone surfaces on the other valve stem part and in the casing, and a spring for maintaining said cone surfaces constantly in engagement.

3. A valve, embodying a casing, a two-part valve stem rotatable in said casing, said parts being independently movable longitudinally with respect to each other, a valve closure carried by and longitudinally movable on one of said valve stem parts to and from its closed position when said valve stem is rotated, coöperating means on said last named part and in the casing for limiting movement of said part in one direction, a lock nut screw threaded in said casing and having oppositely disposed cone faces, one engaging a similar face on said last named part to limit its movement in the opposite direction, a cone face on the other valve stem part engaging the other cone face of said lock nut, and a spring engaging said other part for constantly forcing said part toward said lock nut.

4. A valve, embodying a casing, a two-part valve stem rotatable in said casing, said parts being independently movable longitudinally with respect to each other, a valve closure carried by and longitudinally movable on one of said valve stem parts to and from its closed position when said valve stem is rotated, coöperating means on said last named part and in the casing for limiting movement of said part in one direction, a lock nut screw threaded in said casing and having oppositely disposed cone faces, one engaging a similar face on said last named part to limit its movement in the opposite direction, a cone face on the other valve stem part engaging the other cone face of said lock nut, a spring engaging said other part for constantly forcing said part toward said lock nut, and a nut adjustably engaged with said casing and bearing on said spring for varying the tension of the latter.

5. A valve, embodying a casing, a two-part valve stem comprising a lower screw member and an upper member independently movable longitudinally with respect to each other, coöperating coned sealing surfaces on said upper member and in said casing, a spring for exerting a constant sealing contact between said surfaces, and oppositely disposed surfaces against which said screw member contacts to hold the same against thrust in either direction.

6. A valve, embodying a casing, a two-part valve stem comprising a lower screw member and an upper member independently movable longitudinally with respect to each other, a lock nut in said casing having a coned surface against which a coned surface on said upper member contacts to form a seal, and a spring for constantly pressing said surfaces into contact, said lock nut having a surface against which said screw member contacts to hold said screw member against thrust in one direction.

In testimony whereof, I have hereunto set my hand in the presence of two subscribing witnesses.

WILLIAM C. MARSH.

Witnesses:
N. F. GOULD,
VILLA R. MARSH.